United States Patent
Ploucha et al.

(10) Patent No.: US 10,691,805 B2
(45) Date of Patent: Jun. 23, 2020

(54) RESIDENT MANUFACTURING TEST SOFTWARE BASED SYSTEM FOR MITIGATING RISKS ASSOCIATED WITH VEHICLE CONTROL MODULES

(71) Applicant: GM Global Technology Operations LLC, Detroit, MI (US)

(72) Inventors: Joseph E. Ploucha, Commerce Township, MI (US); Cheryl A. Williams, Howell, MI (US); Robert F. Semrau, Ovid, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 255 days.

(21) Appl. No.: 15/896,207

(22) Filed: Feb. 14, 2018

(65) Prior Publication Data
US 2019/0251265 A1    Aug. 15, 2019

(51) Int. Cl.
*G06F 21/50*     (2013.01)
*G06F 21/57*     (2013.01)
*B60W 50/04*     (2006.01)
*B60W 50/02*     (2012.01)

(52) U.S. Cl.
CPC ....... *G06F 21/575* (2013.01); *B60W 50/0205* (2013.01); *B60W 50/04* (2013.01); *G06F 21/577* (2013.01)

(58) Field of Classification Search
CPC .... G06F 9/44502; G06F 9/44508; G06F 1/24; G06F 9/44526; G06F 15/177; G06F 9/44514; G06F 9/44523; G06F 11/1417; G06F 9/44505
See application file for complete search history.

(56) References Cited

U.S. PATENT DOCUMENTS

| | | | |
|---|---|---|---|
| 7,554,855 B2* | 6/2009 | Kim | G11C 11/005 365/185.11 |
| 9,619,357 B2* | 4/2017 | Jain | G06F 9/5094 |
| 2010/0110748 A1* | 5/2010 | Best | G11C 11/005 365/51 |
| 2011/0258364 A1* | 10/2011 | Leung | G06F 12/0246 711/103 |
| 2014/0047251 A1* | 2/2014 | Kottilingal | G06F 12/1027 713/320 |
| 2014/0075579 A1* | 3/2014 | Baltes | G06F 8/61 726/30 |
| 2016/0224252 A1* | 8/2016 | Hutsell | G06F 12/0802 |

(Continued)

*Primary Examiner* — Zahid Choudhury

(57) ABSTRACT

A vehicle control module is provided and includes a hybrid memory and a processor. The hybrid memory includes: application memory that stores application code; boot memory that stores a first RMTS code, where the first RMTS code includes first risk functions; and ETM that temporarily stores a second RMTS code. The second RMTS code includes second risk functions. The processor: based on an operating mode of the vehicle control module, executes the application, first RMTS and second RMTS codes; erases the ETM prior to installation of the vehicle control module in a vehicle or delivery of the vehicle; and based on the first RMTS code, permits execution of the first RMTS code prior to and subsequent to installation of the vehicle control module in the vehicle and the second RMTS code prior to installation of the vehicle control module in the vehicle or delivery of the vehicle.

20 Claims, 6 Drawing Sheets

(56) References Cited

U.S. PATENT DOCUMENTS

2016/0378388 A1* 12/2016 Hegde ................... G06F 3/0652
                                                    711/166
2019/0108043 A1*  4/2019 Yan ..................... G06F 13/4282

* cited by examiner

RESIDENT MANUFACTURING TEST SOFTWARE BASED SYSTEM FOR MITIGATING RISKS ASSOCIATED WITH VEHICLE CONTROL MODULES

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

A vehicle typically includes multiple vehicle control modules for controlling operations of various vehicle systems, such propulsion systems, air-conditioning systems, infotainment systems, lighting systems, navigation systems, collision avoidance systems, etc. The vehicle manufacturer (or original equipment manufacturer (OEM)) and/or dealerships of the vehicle manufacturer may also perform tests (e.g., diagnostic tests) on the vehicle control modules. However, in order to limit the scope of privileged users to as needed, only ECU manufacturers and vehicle manufactures should be considered for accessing and executing functions associated with resident manufacturing test software (RMTS). The RMTS may be used to read inputs, arbitrarily drive outputs and/or communicate over serial data interfaces of the vehicle control modules while in a controlled environment. The testing of the vehicle control modules may occur at facilities of the suppliers and vehicle manufacturer and/or at the dealerships for warranty analysis. As referred to herein the "testing" does not refer to generic diagnostic inquiries, but rather refer to highly restricted test functionality only used by ECU manufacturers. The RMTS functionality is only available to ECU manufacturers, not dealerships and vehicle manufacturers.

In order to achieve product quality targets ECU suppliers have the option to develop and use test software colloquially referred to as resident manufacturing test software for the purposes of manufacturing processes such as programming, reprogramming, testing (final functional test and end of line testing) and warranty analysis. A fully realized set of ECU manufacturing functions to support these processes requires that suppliers have the ability to execute safety and security sensitive operations in a manner which is contradictory to product cybersecurity objectives. To achieve a balance between supplier production and quality processes and product cybersecurity initiatives, the availability and capability of RMTS in an ECU may be considered in the context of the stages of the component life cycle. The shared objective of supplier processes and product cybersecurity initiatives is to ensure that there are no unsecured or insufficiently secured capabilities within manufacturing test software that may be used by un-privileged entities (tuners, criminal organizations, competitors) to reverse engineer or modify the specified performance of an ECU without consideration for the stages of the device lifecycle.

SUMMARY

A vehicle control module is provided and includes a hybrid memory and a processor. The hybrid memory includes: application memory configured to store application code; boot memory configured to store a first resident manufacturing test software (RMTS) code and boot code, where the first RMTS code includes a first set of risk functions; and ephemeral test memory configured to temporarily store a second RMTS code accessible only from the first RMTS code. The second RMTS code includes a second set of risk functions. The processor is configured to: based on at least an operating mode of the vehicle control module, execute the boot code, execute the application code, the first RMTS code and the second RMTS code; erase the ephemeral test memory prior to at least one of installation of the vehicle control module in a vehicle or delivery of the vehicle to a customer; and based on the first RMTS code, permit execution of the first RMTS code prior to and subsequent to installation of the vehicle control module in the vehicle and permit execution of the second RMTS code prior to at least one of installation of the vehicle control module in the vehicle or delivery of the vehicle to a customer. The first RMTS code is permitted to be executed when the vehicle control module has been removed from the vehicle.

In other features, the boot memory is configured to store boot code for booting up the vehicle control module. A bootloader of the boot code does not have access to the ephemeral test memory.

In other features, at least some of the second set of risk functions have a higher risk than the first set of risk functions.

In other features, the first RMTS code supports production and warranty analysis of the vehicle control module. The first RMTS code includes a function for reading inputs of the vehicle control module, a function for arbitrarily driving outputs of the vehicle control module, a function for querying the ephemeral test memory, a function to determine if the second RMTS code is stored in the ephemeral test memory, and a function to initiate a power-up reset of the vehicle control module.

In other features, the second RMTS code includes at least one of a function for manipulating a memory of the vehicle control module or a function for emulating elements of the behavior of the vehicle control module.

In other features, the processor is configured to (i) receive a diagnostic control signal from a diagnostic test control module to erase the ephemeral test memory, and (ii) based on the diagnostic control signal and while executing boot software, erase the ephemeral test memory; and the diagnostic test control module is separate from the vehicle control module.

In other features, the processor is configured to check a status of the ephemeral test memory based on a request signal received from a diagnostic test control module; and the diagnostic test control module is separate from the vehicle control module.

In other features, the processor is configured to, if high risk RMTS functions are stored in the ephemeral test memory, at least one of permit access to the ephemeral test memory or execution of the second RMTS code from the first RMTS code; and the second RMTS code includes the high risk RMTS functions.

In other features, the processor is configured to execute the application code and while executing the application code generate a data identifier to check a status of the ephemeral test memory.

In other features, the processor is configured to: based on the status of the ephemeral test memory, receive a diagnostic control signal from a diagnostic test control module; and based on the routing identifier, erase the ephemeral test memory and update one or more software integrity check values in one or more blocks of the ephemeral test memory. The diagnostic test control module is separate from the vehicle control module.

In other features, the processor is configured to: receive and store the second RMTS code in the ephemeral test memory; generate a software integrity check value indicating a status of at least a portion of the ephemeral test memory; and store the software integrity check value in a portion of a block of the ephemeral test memory. The software integrity check value is a software image of another portion of the block of the ephemeral test memory.

In other features, the processor is configured to: during boot up of the vehicle control module, check a status of an interface of the vehicle control module including receiving signals at the interface; based on the signals, determining whether environmental enabling conditions are satisfied; and based on whether the environmental enabling conditions are satisfied, at least one of permitting access to the ephemeral test memory or execution of the second RMTS code.

In other features, the processor is configured to: execute a security procedure including receiving security information from a diagnostic test control module and verifying the security information; and if the security information is verified and the environmental enabling conditions are satisfied, then at least one of permitting access to the ephemeral test memory or execution of the second RMTS code. The diagnostic test control module is separate from the vehicle control module.

In other features, the processor is configured to: check the status of the interface a predetermined number of times; determine whether a predetermined period has lapsed since the interface was first checked after a last power up was initiated of the vehicle control module; and if the environmental enabling conditions are not satisfied after the predetermined number of times or after the predetermined period has lapsed, then boot the vehicle control module, such that at least one of access to or execution of the second RMTS code is prevented.

In other features, a non-transitory computer-readable medium is provided and includes: application memory configured to store application code; boot memory configured to indefinitely store a first RMTS code; and ephemeral test memory configured to temporarily store a second RMTS code. The first RMTS code includes a first set of risk functions, where the second RMTS code includes a second set of risk functions. The non-transitory computer-readable medium having stored thereon instructions executable by a processor to: based on at least an operating mode of a vehicle control module, execute the application code, the first RMTS code and the second RMTS code; erase the ephemeral test memory prior to at least one of installation of the vehicle control module in a vehicle or delivery of the vehicle to a customer; and based on the first RMTS code, permit execution of the first RMTS code prior to and subsequent to installation of the vehicle control module in the vehicle, and permit execution of the second RMTS code prior to at least one of installation of the vehicle control module in the vehicle or delivery of the vehicle to a customer.

In other features, at least some of the second RMTS code includes higher risk functions than the first RMTS code. The first RMTS code includes a function for reading inputs of the vehicle control module, a function for arbitrarily driving outputs of the vehicle control module, a function for querying the ephemeral test memory, a function to determine if the second RMTS code is stored in the ephemeral test memory, and a function to initiate a power-up reset of the vehicle control module. The second RMTS code includes at least one of a function for manipulating a memory of the vehicle control module or a function for emulating elements of the behavior of the vehicle control module.

In other features, the instructions are further to: check a status of the ephemeral test memory based on a request signal received from a diagnostic test control module, where the diagnostic test control module is separate from the vehicle control module; and if high risk RMTS functions are stored in the ephemeral test memory, at least one of permit access to the ephemeral test memory or execution of the second RMTS code. The second RMTS code includes the high risk RMTS functions.

In other features, the instructions are further to: execute the application code and while executing the application code generate a data identifier to check a status of the ephemeral test memory; based on the status of the ephemeral test memory, receive a diagnostic control signal from a diagnostic test control module, wherein the diagnostic test control module is separate from the vehicle control module; and based on the diagnostic control signal, erase the ephemeral test memory and update one or more software integrity check values in one or more blocks of the ephemeral test memory.

In other features, the instructions are further to: receive and store the second RMTS code in the ephemeral test memory; generate a software integrity check value indicating a status of at least a portion of the ephemeral test memory; and store the software integrity check value in a portion of a block of the ephemeral test memory. The software integrity check value is a software image of a second portion of the block of the ephemeral test memory.

In other features, the instructions are further to: during boot up of the vehicle control module, check a status of an interface of the vehicle control module including receiving signals at the interface; based on the signals, determine whether environmental enabling conditions are satisfied; and based on whether the environmental enabling conditions are satisfied, at least one of permit access to the ephemeral test memory or execution of the second RMTS code.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
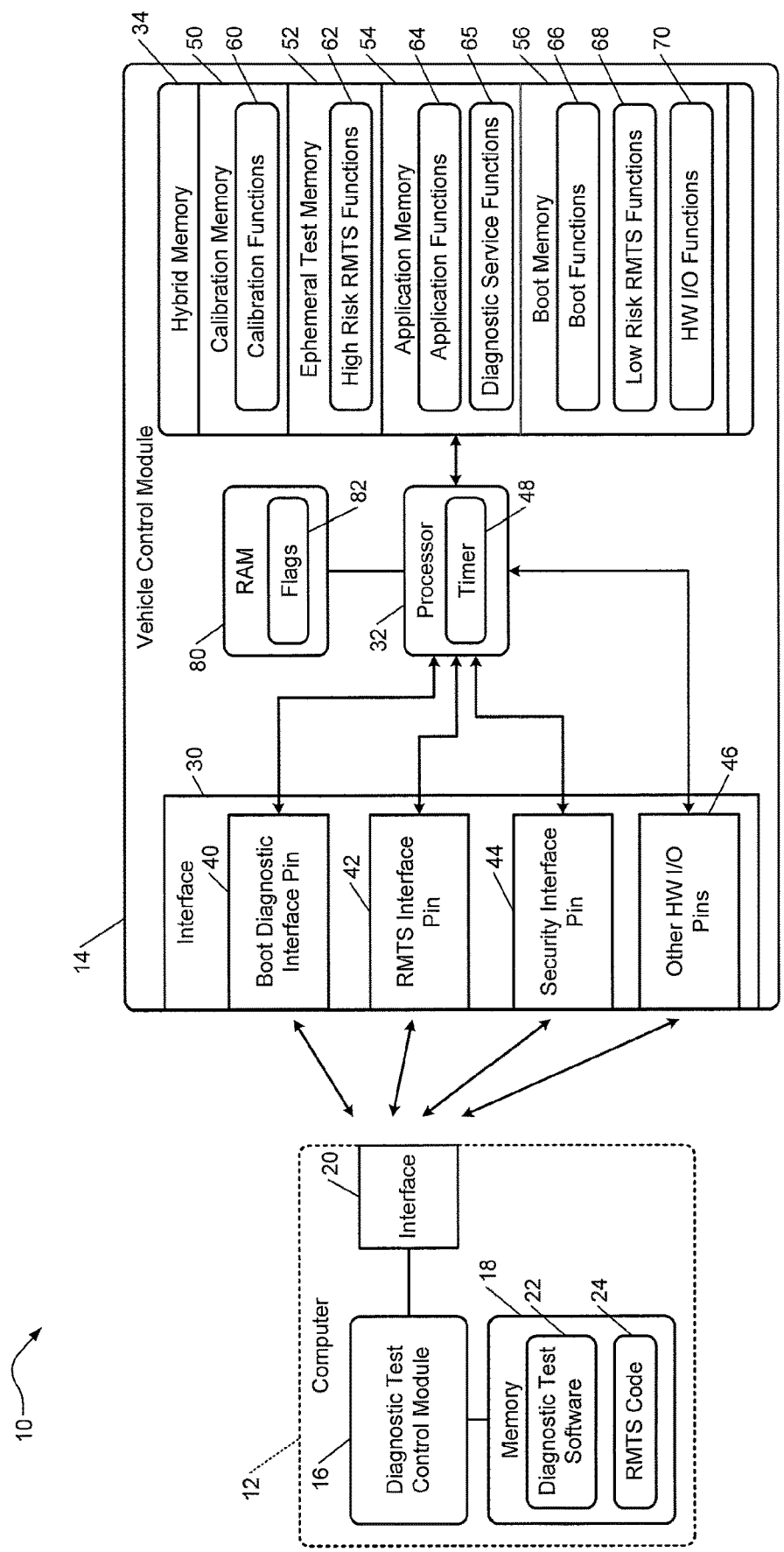
FIG. 1 is a functional block diagram of an example of a testing system including a vehicle control module with a hybrid memory and implementing RMTS protocols in accordance with an embodiment of the present disclosure.

Example RMTS based systems and methods are set forth herein. Corresponding RMTS disclosed herein is downloadable to non-volatile memory of vehicle control modules and accessible by suppliers. The RMTS may include low risk functions and high risk functions. Some examples of low risk functions are reading inputs and arbitrarily driving outputs. Other examples are described below. Examples of high risk functions are functions associated with emulating elements of the behavior of a vehicle control module and/or manipulating memory of the vehicle control module. The high risk functions, if left on a vehicle control module, may be accessed by unsanctioned entities (or an attacker). This may occur while the vehicle control module is installed in a vehicle. An unsanctioned entity may then access data on the vehicle control module and/or override and control operations of the vehicle control module.

Examples set forth herein allow suppliers to: securely support manufacturing of vehicle control modules; perform warranty analysis of the vehicle control modules post installation in a vehicle and delivery of the vehicle control module to a customer; and the ability to reprogram pre-shipped vehicle control modules using supplier defined flash drivers, which do not necessarily conform to OEM flash programming requirements. The warranty analysis may be performed on a vehicle control modules when the vehicle control module has been removed from the vehicle. The examples include vehicle control modules with hybrid memories including (i) accessible non-volatile memories for storing low risk functions indefinitely, and (ii) limited access non-volatile ephemeral test memories (ETMs) for temporarily storing high risk functions. The low risk functions remain on the vehicle control modules and may be executed to support hardware integrity checks during warranty analysis. The high risk functions are then erased from ETM at an ECU supplier prior to the corresponding vehicle control module being shipped to an OEM or by an OEM prior to completion of vehicle manufacturing. The stated advantages reduce overall supplier manufacturing programming times of the vehicle control modules due to a reduced number of security protocols to follow over properly secured control modules and support reworking (or reprogramming) of the vehicle control modules. This flexibility allows suppliers to address production line capacity targets, reduce scrap costs associated with faulty vehicle control modules, and support warranty analysis.

The examples define a unique set of performance and diagnostic service requirements along with providing a unique class of non-volatile memory (i.e. ETM) to address production and test functions stored on vehicle control modules. Traditionally, supplier methods related to accessing RMTS were ad-hoc and had diverse security risks, which resulted in unsanctioned entities having the ability to access the RMTS while in a vehicle.

The examples provide a set of RMTS access controls including storing low risk functions indefinitely in accessible non-volatile memory and high-risk functions temporarily in ETM. Access to RMTS functions is only made possible during a brief period during the ECU power up sequence. Within that window RMTS functions can only be enabled after controller software validates the state of a combination of electrical threshold checks on vehicle control module input signals to confirm that the controller is not connected to a harness in an OEM vehicle. Having passed the electrical conditions check, the protocol requires at least one check of security credentials based on a 128 bit or longer randomly generated password, symmetric and/or asymmetric cryptography. Based upon a limited and hardcoded number of maximum attempts to validate security credentials, RMTS shall be permanently disabled and ETM erased without providing user feedback after exceeding the non-threshold for which valid security credentials must be provided. The system may store in permanent memory the count of all failed security credential checks to prevent an adversary from resetting the failed check counter by cycling control module power and setting the count back to zero. The high risk functions are erased from the ETM prior to completion of vehicle manufacturing and thus cannot be executed subsequent to delivery of the vehicle. In addition, the memory space of RMTS, which includes ETM, is unknown to the bootloader. This further prevents an unsanctioned entity from executing boot software of a vehicle control module and accessing the ETM for potential reprogramming.

The ETM is not boot programmable and is diagnostically erasable. The examples include checking statuses of ETMs subsequent to delivery of a corresponding vehicle and performing operations to have the ETMs erased if not already erased prior to completion of vehicle manufacturing. This further assures that high risk functions are removed and are inaccessible to unsanctioned entities even if controller memory is partially compromised during an attempted memory based attack at some future date. The examples eliminate the need for a vehicle manufacturer to analyze RMTS, which is generated by suppliers and stored in vehicle control modules, to assure that high risk functions either are not stored in the vehicle control modules and/or are inaccessible to unsanctioned entities.

RMTS guidelines are established for suppliers to store standardized low risk functions in accessible non-volatile memory and high risk functions in ETM. A risk level is assigned to each function supporting manufacturing of a vehicle control module and warranty analysis of the vehicle control module. The manufacturing software with the ability to emulate behavior of a vehicle control module and/or modify memory of a vehicle control module are classified as high risk functions, are prevented from being stored in accessible non-volatile memory, and are temporarily stored in ETM. Other functions used to interrogate controller hardware characteristics and request access to ETM are classified as low risk and may be indefinitely stored in the accessible non-volatile memory.

FIG. 1 shows a testing system 10 that may include a computer 12 and a vehicle control module 14. The computer 12 may be, for example, a vehicle manufacturer, supplier, dealership and/or other software test and/or diagnostic computer. The computer 12 may include a diagnostic test control module 16, a memory 18 and an interface 20. The computer 12 may be a supplier computer, a vehicle manufacturer computer, a vehicle dealer computer, or other diagnostic test computer. The diagnostic test control module 16 may execute diagnostic test software 22 and download RMTS code 24 to the vehicle control module 14. The vehicle control module 14 may be referred to as an electronic control unit (ECU) and may include an interface 30, a processor 32 and a hybrid memory 34.

The interface 30 may include a boot diagnostic interface pin 40, a RMTS interface pin 42, a security interface pin 44, and other hardware (HW) input and output (I/O) pins 46. Each of the interfaces 20, 30 and each of the pins 40, 42, 44, 46 may be referred to as communication interfaces. Although shown as separate pins, the pins 40, 42, 44 may be implemented as a single pin, for example as a controller area network (CAN) bus pin. The other HW I/O pins 46 may include one or more power supply pins, input control pins, status pins, output control pins, actuator pins, etc. The output control pins and the actuator pins may be used for controlling devices and/or actuators included in vehicle systems. In an alternative embodiment, the interfaces 30 may communicate wirelessly with the interface 20 and/or devices and other vehicle control modules in a vehicle. This may be accomplished via wireless transceivers in the interfaces 20, 30, the devices, and other vehicle control modules.

The hybrid memory 34 may be non-volatile memory and is sectioned to include calibration memory 50, ETM 52, application memory 54, and boot memory 56. The calibration memory 50 stores calibration functions 60 including corresponding code and data. The calibration memory 50 is prevented from storing high risk RMTS functions. The calibration memory 50 is boot programmable.

The ETM 52 stores high risk RMTS functions 62. The ETM 52 temporarily stores software integrity check values, such as a checksum (or cyclical redundancy check (CRC)) bits and high risk RMTS functions (or high risk RMTS code) 62. The high risk RMTS functions 62, in addition to those disclosed above, may include alternate, non-OEM specific boot drivers. One of the high risk RMTS functions 62 provides the ability for the diagnostic test control module 16 to read out and/or download software and/or drivers from flash memory. The flash memory may refer to the portions of the hybrid memory 34 that are boot programmable.

A fixed number of bytes of each block of the ETM 52 may include a value validating the integrity of the software image of the remainder of the block including unused addresses. The value may indicate whether high risk software is stored in the corresponding block or whether the corresponding block has been erased. In one embodiment, the RMTS has a fixed response to a diagnostic query if the ETM has not been used to store a high risk function. The fixed response may be a fixed value. The fixed value may not be calculated during an integrity test, but rather may be simply stored and accessed. The checksum value of each ETM block may be, for example, a hash function of an image of the software stored in a remainder of that ETM block including any unused addresses. The ETM 52 is outside a software memory map of the hybrid memory 34 and is not boot programmable. The software memory map may be stored in the hybrid memory 34, the RAM 80 and/or elsewhere. During programing of the ETM 52 at a supplier manufacturing facility, unused ETM addresses are defaulted to a common non-functional value (NOP (or no operation) codes).

The application memory 54 stores: application functions 64 including corresponding code; and diagnostic service functions 65 including data identifier (DID) service functions and corresponding code. The application memory 54 is boot programmable and includes a diagnostic kernel for implementing a DID service function to check the ETM 52 and other diagnostic service functions. The DID service function is executed to determine whether one or more high risk functions are stored in ETM 52. The application functions 64 include applications executed by the processor 32 while in use and while not being booted up. Some of the applications are executed to control vehicle systems.

The boot memory 56 stores boot functions 66, low risk functions (or low risk RMTS code) 68 and HW I/O functions 70. The boot code of the boot memory 56 includes the boot functions 66, the low risk RMTS functions (or code) 68, and the HW I/O functions (or code) 70. The boot memory 66 is outside the software memory map of the hybrid memory 34 and is not boot programmable. The RMTS allocated memory and the ETM 52 are not known to the boot functions 66 (or boot software) and thus cannot be reprogrammed. The boot functions 66 include diagnostic control functions, such as routine identifier (RID) functions, control parameter identifier (CPID) functions, and/or other diagnostic and boot functions. One or more of the boot functions may be referred to as a bootloader that is executed to boot up the vehicle control module 14. One of the diagnostic control functions includes an ETM erase function for erasing the ETM 52.

The low risk RMTS functions 68 include functions to: read inputs of the vehicle control module 14; arbitrarily drive outputs of the vehicle control module 14; query the ETM 52 to validate presence of high risk functions stored in the ETM 52; access functions located in the ETM 52 when high risk functions are stored in the ETM 52; and initiate a power-up reset. The low risk functions support production and warranty analysis initiatives. RMTS functions that are not included in the low risk RMTS functions 68 may be stored in the ETM 52. A power-up reset refers to returning settings of the vehicle control module 14 and/or the hybrid memory 34 to states when the vehicle control module was previously powered up. This may include resetting a micro program counter to an initialization state and/or to certain code in the hybrid memory 34. The low risk RMTS functions 68 may be controlled over a data link (or one or more pins of the interface 30) by the diagnostic test control module 16.

Although shown as a single memory, the hybrid memory 34 may be divided into separate distinct memories (e.g., separate memory chips). As an example, the ETM 52 may be a separate memory from the memories 50, 54 and 56. The ETM includes one or more boundary aligned locks of memory that are outside of the software memory map and may be erased via invocation of an ERASE interface command. The ETM 52 may be erased without affecting contents of other memory. Memory (e.g., the ETM 52) that is outside the software memory map is not flash programmable via a non-volatile memory programming function. The memory space for the ETM 52 may be non-volatile boot code memory allocated by a supplier, non-volatile calibration memory segments or up to a predetermined amount (e.g., half) of non-volatile wear leveling memory. The non-volatile wear leveling memory is non-volatile memory used for wear leveling to replace other memory becoming unreadable due to a high number of access cycles. Data stored in the non-volatile wear leveling memory remains independent of whether the non-volatile wear leveling memory is receiving power.

The processor 32 controls access to the hybrid memory 34 based on signals received from the interface 30. The processor 32 may execute software and functions stored in the hybrid memory 34. The processor may implement RMTS protocols described herein. This may include limiting access to and erasing high risk functions. In an embodiment, the processor 32 includes a timer 48. The timer 48 is used during power up of the vehicle control module 14 to determine whether "environmental" enabling conditions have been satisfied to revert to enabling low risk RMTS functions. As an example, the environmental enabling conditions refer to whether a predetermined set of signals exist on a predetermined set of the pins of the interface 30. This may include checking voltages, frequencies and/or duty cycles of the signals.

During a power up event, the processor 32 may check the pins of the interface 30 to determine whether the environmental enabling conditions have been satisfied. The environmental enabling conditions may be voltages, frequencies and/or duty cycles that would not normally be present within an environment of a normally operating vehicle for which the corresponding vehicle control module (or ECU) is designed to be installed. The timer 48 may also be running while the environmental enabling conditions are checked. If the environmental enabling conditions are not satisfied, then a normal boot up process is performed. The processor 32 may check the pins multiple times. Each time the pins are checked, the processor 32 may store status information in random access memory (RAM) 80. In an embodiment, the status information is stored as 32-bit flags 82, one flag for each time the conditions are checked. The values of the flags may be a ones-compliment of each other and do not match values of flags associated with erasing memory and/or performing the application functions 64. These features prevent RMTS from being executed during a power-up reset while the vehicle control module 14 is installed in a vehicle and/or subsequent to being delivered to a customer. No single point of failure within or external to the vehicle control module 14 results in a false passage of the environmental enabling conditions.

Figure 2:
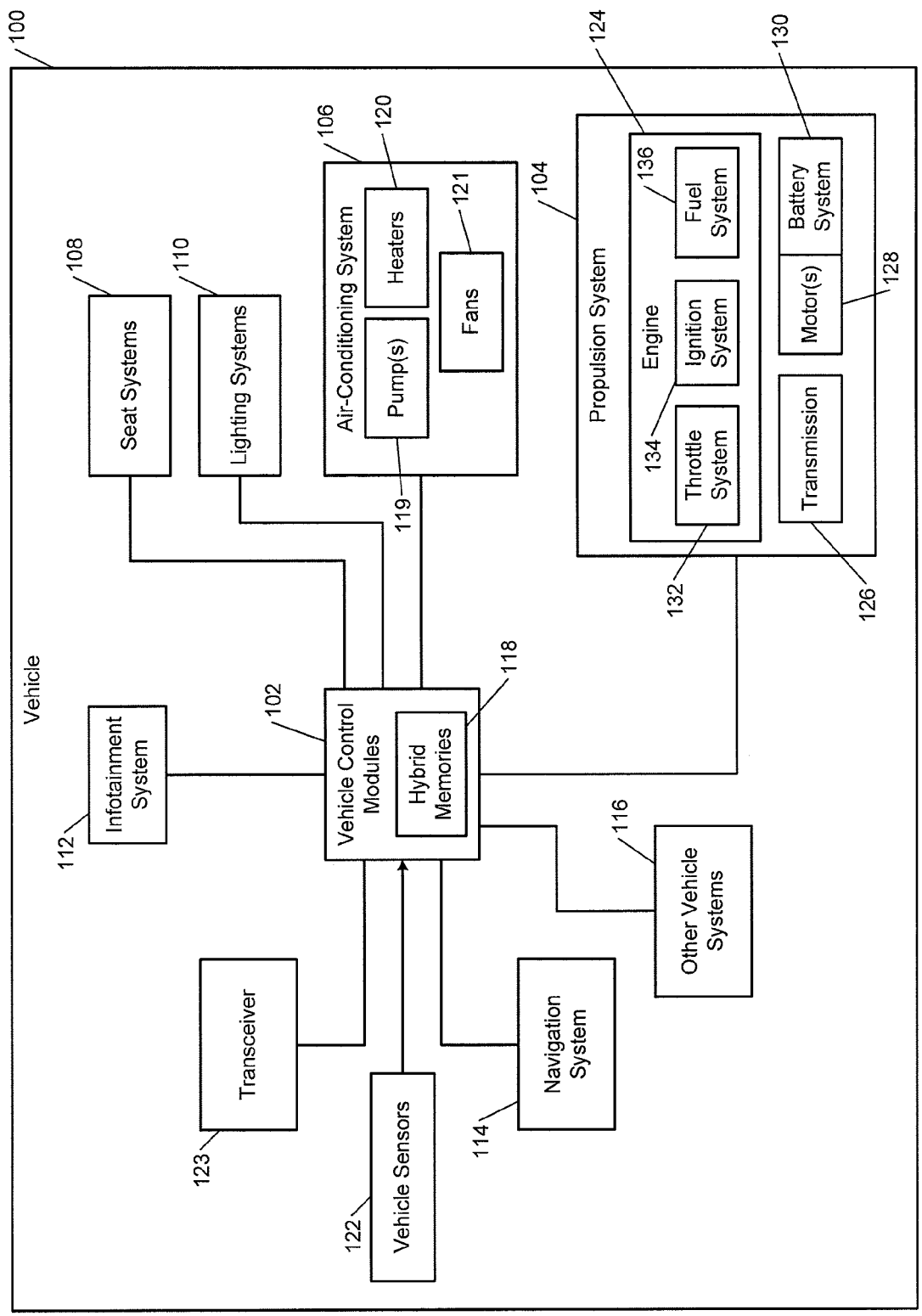
FIG. 2 is a functional block diagram of an example of a vehicle including a vehicle control module with a hybrid memory and implementing RMTS protocols in accordance with the present disclosure.

FIG. 2 shows a vehicle 100 that includes a vehicle control module 102, which may be implemented as the vehicle control module 14 of FIG. 1. The vehicle control module 102 controls operations of various vehicle systems including controlling operations of a propulsion system 104, an air-conditioning system 106, seat systems 108, lighting systems 110, infotainment system 112, navigation system 114, and/or other vehicle systems 116, such as a braking system, a communication system, etc. The vehicle control module 102 may execute applications stored in an application memory of a hybrid memory 118 to control the vehicle systems. The vehicle systems may include actuators. For example, the air-conditioning system 106 may include one or more pump(s) 119, heaters 120, and fans 121. This control may be based on signals from sensors 122 and may include wireless communication via a transceiver 123. The propulsion system 104 may include an engine 124, a transmission 126, one or more motors 128, and a power source (e.g., a battery system) 130. The engine 124 may include a throttle system 132, an ignition system 134, and a fuel system 136.

Figure 3:
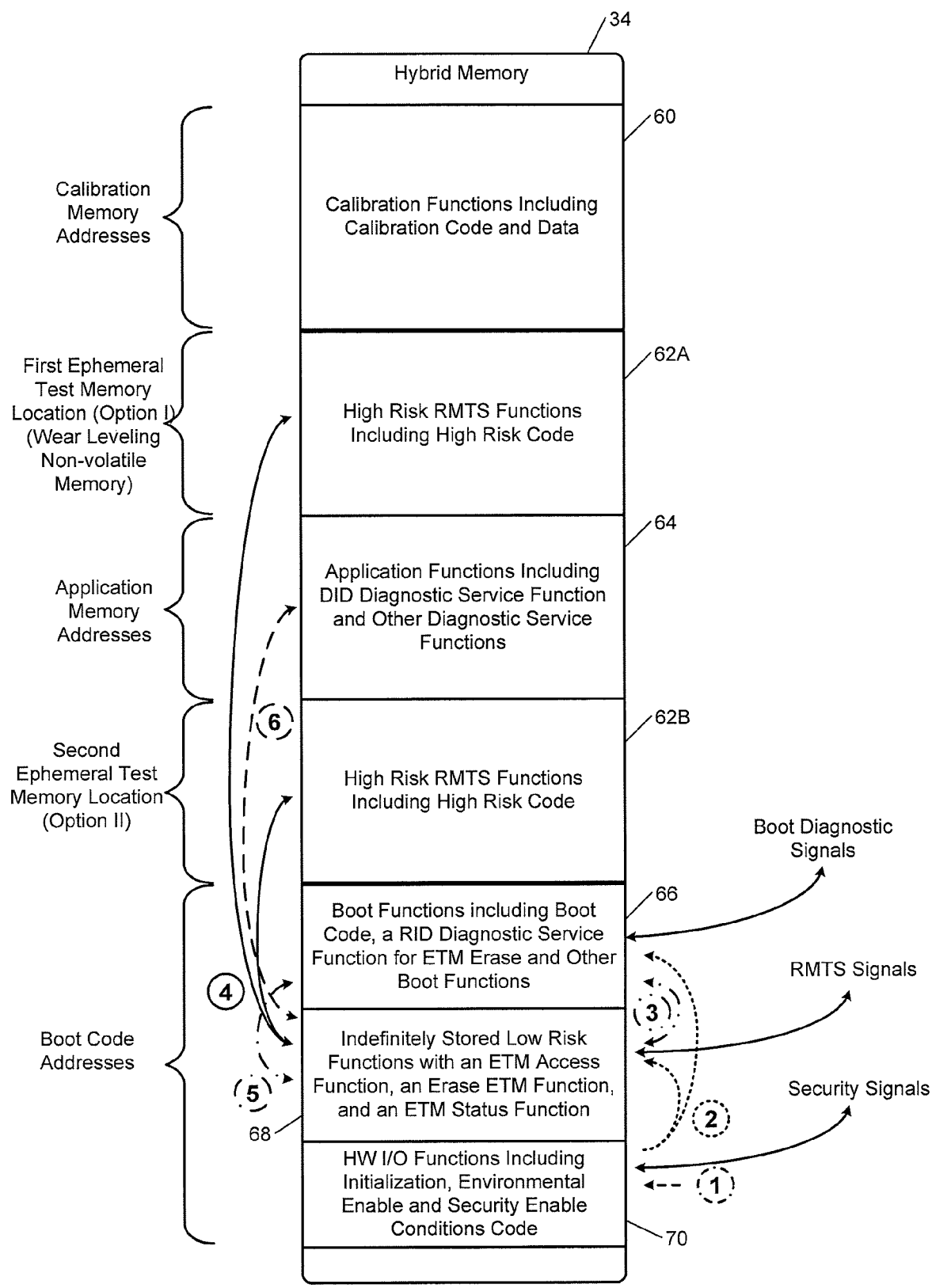
FIG. 3 is a functional block diagram of an example of a hybrid memory including ephemeral test memory in accordance with an embodiment of the present disclosure.

FIG. 3 shows an example of the hybrid memory 34 of FIG. 1 storing: the calibration functions (or code and data) 60; the high risk RMTS functions 62 (shown as 62A and 62B); the application functions 64, which may include the diagnostic service functions 65 (shown in FIG. 1); and the boot functions 66; the low risk RMTS functions 68; and the HW I/O functions 70. The high risk RMTS code 62A may be stored in non-volatile wear leveling memory. The high risk RMTS functions 62 may be stored in one or more locations in the hybrid memory 34. Example locations are represented by 62A and 62B. The code associated with the memories 50, 52, 54 and 56 of FIG. 1 have corresponding addresses. This is illustrated in FIG. 3 by the identified calibration memory addresses, the first ETM addresses, the application memory addresses, the second ETM addresses, and the boot code addresses.

The RMTS software stored in the hybrid memory 34 including the low risk RMTS functions 68 and the high risk RMTS functions 62 may be executed independently of and may not invoke application software and/or other boot software. The RMTS may prevent execution of the RMTS while a corresponding vehicle control module is installed in a vehicle and/or has been delivered to a customer.

Figure 4A:
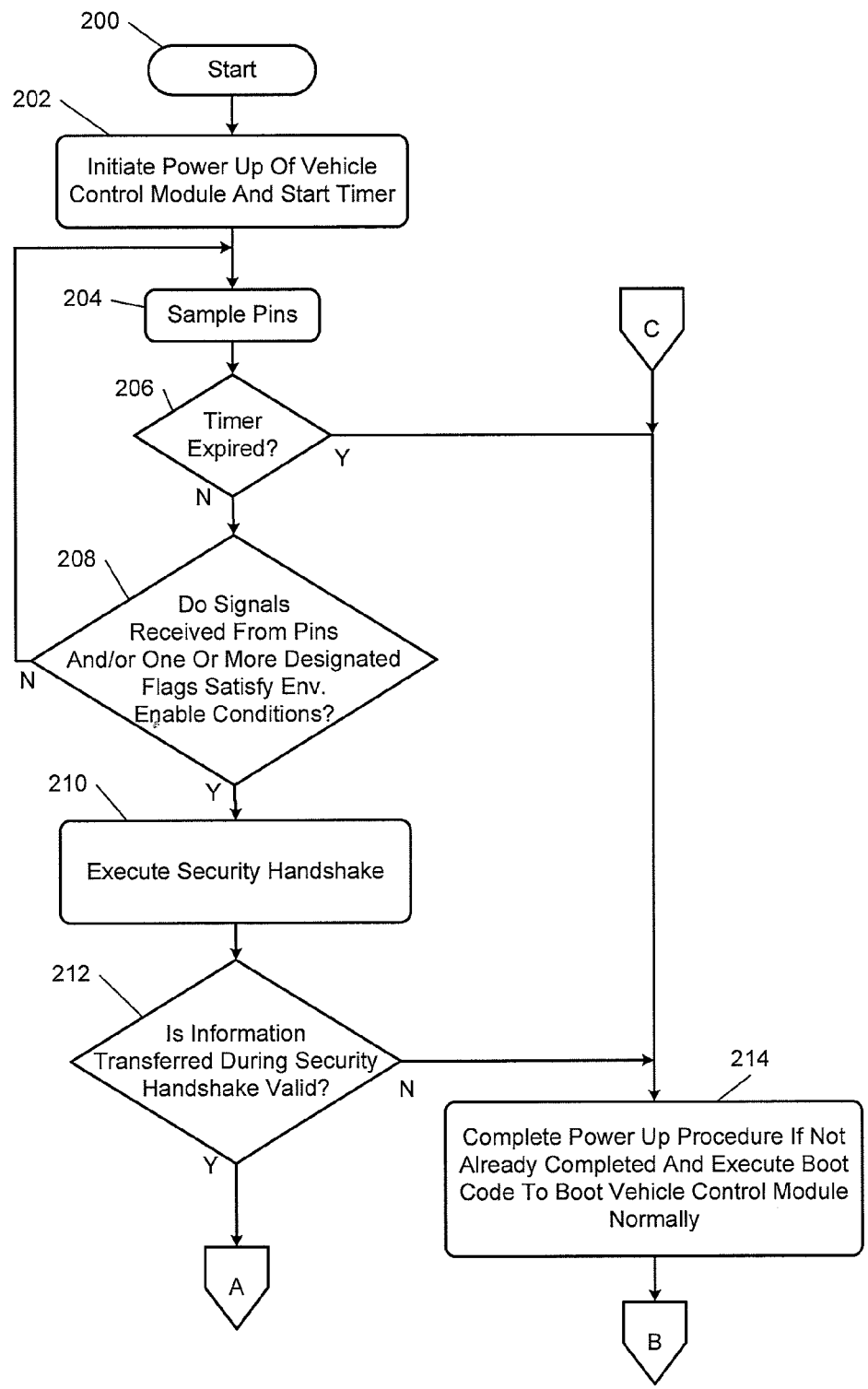
FIGS. 4A-C illustrate a RMTS access method in accordance with an embodiment of the present disclosure.
Figure 4B:
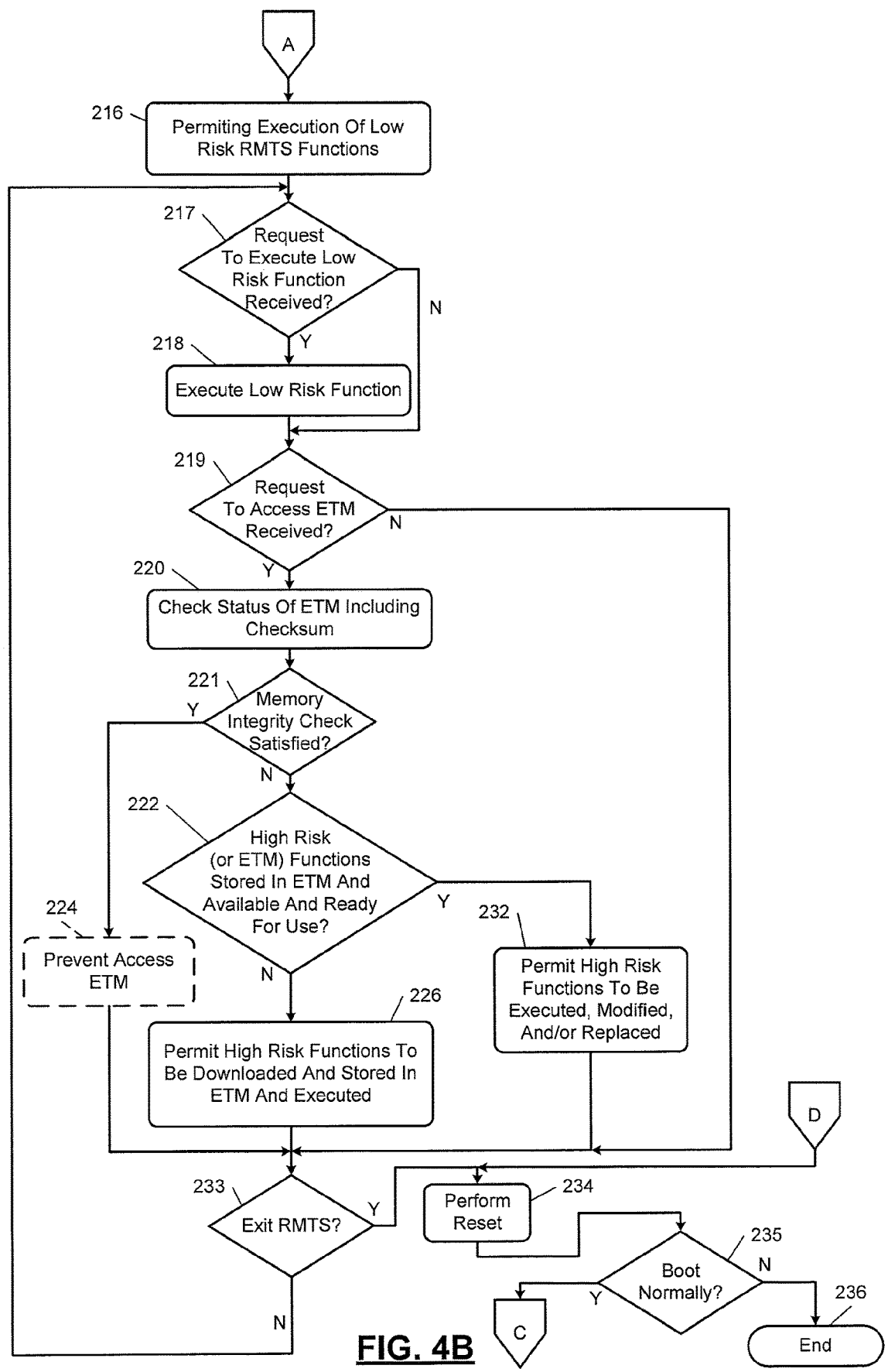
Figure 4C:
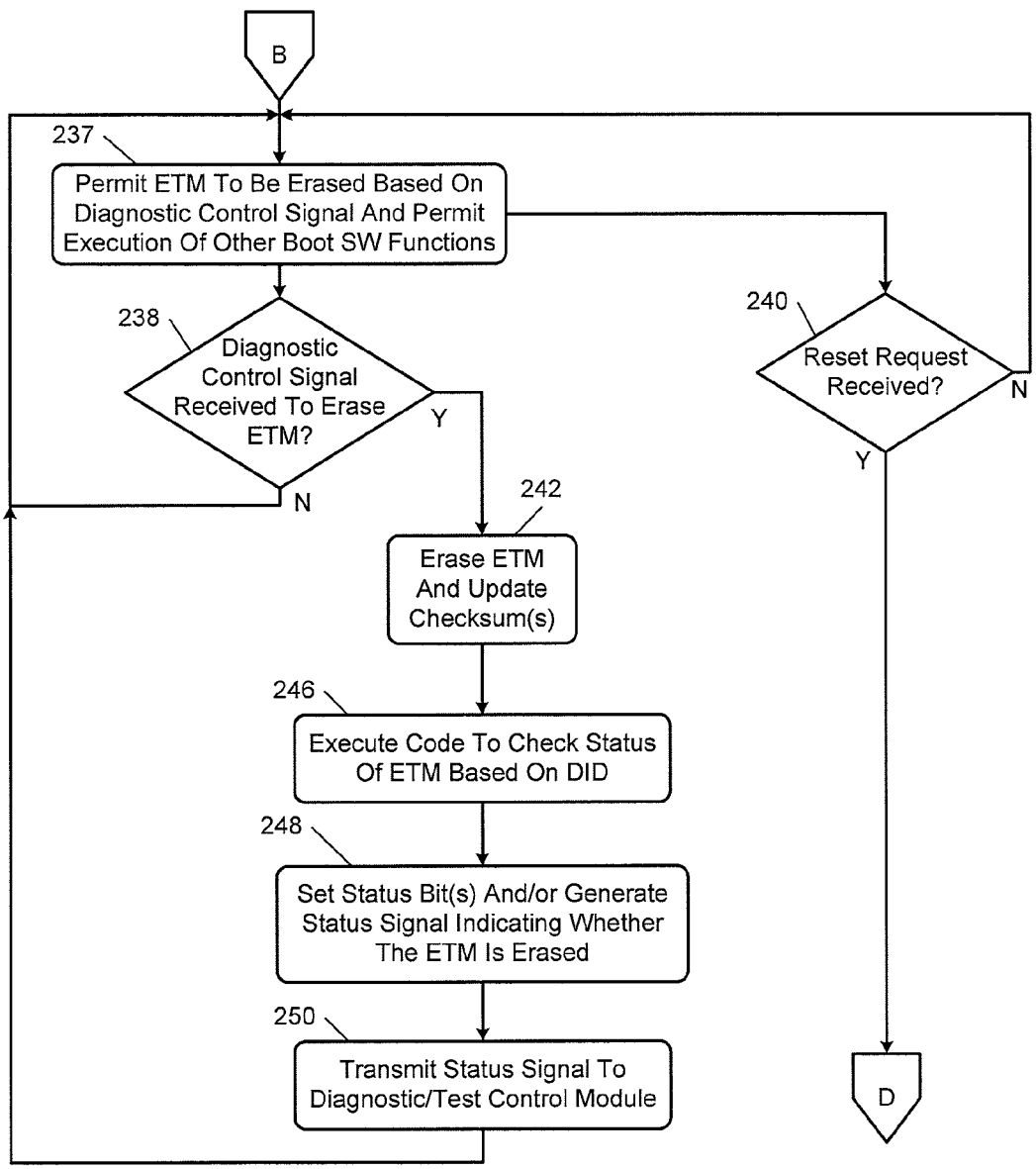

The systems disclosed herein may be operated using numerous methods, an example method is illustrated in FIGS. 4A-4C (collectively FIG. 4). In FIG. 4, a RMTS access method is shown. Although the following operations are shown as being part of a single method, some of the operations may be performed separately as a separate distinct method. Although the following operations are primarily described with respect to the implementations of FIG. 4, the operations may be easily modified to apply to other implementations of the present disclosure. The operations may be iteratively performed.

The method may begin at 200. The following operations may be performed by a processor (e.g., the processor 32) of a vehicle control module (e.g., the vehicle control module 14) while executing functions stored in a hybrid memory (e.g., the hybrid memory 34) including RMTS functions. At 202, power up of the vehicle control module is initiated and a timer (e.g., the timer 48) is started. This may be implemented by executing one or more of the HW I/O functions 70 and include HW I/O initialization of hardware of the processor (or microcontroller) 32 and/or other hardware of the vehicle control module. The following operations 204, 206 and 208 are performed to (i) validate an operating environment (in vehicle or out of vehicle) based on signals on a predetermined set of the pins of an interface (e.g., the interface 30) of the vehicle control module, and (ii) verify security enable conditions for accessing the RMTS. The HW I/O functions 70 and/or the low risk RMTS functions 68 may prevent execution of other RMTS software (e.g., the high risk RMTS functions 62 and/or some or all of the low RMTS functions 68) unless a predetermined number of validation and/or verification processes are performed. Operations 204, 206, 208, 210, 212 illustrate examples of a validation and a verification process. These operations correspond to arrow 1 in FIG. 3.

At 204, the signals on the predetermined set of the pins of the interface are sampled. In one embodiment, one or more of the other HW I/O pins 46 are sampled. The signals may be sampled a predetermined number of times, as described above. Corresponding values may be stored in the RAM 80.

At 206, the processor 32 may determine whether the timer has expired. Operations 204 and 208 may be performed for a short predetermined period after power-up of the vehicle control module. If the timer has not expired, operation 208 is performed, otherwise operation 214 is performed.

At 208, the signals on the predetermined set of the pins of the interface may be compared to a predetermined set of signals. As an example, a predetermined set of voltages may include voltages that the predetermined set of pins would not be at during normal operation of the vehicle control module, such as when executing the application functions 64. If the signals on the predetermined set of pins match, then one of the flags stored in the RAM 82 is set indicating a match and the environmental enable conditions are satisfied, otherwise the flag is set indicating no match detected. The pins may be checked, for example, at predetermined intervals (e.g., less than or equal to 25 milli-seconds).

During operation 208, the flag values stored in the RAM 82 are checked. The RMTS ensures that in case the RMTS is invoked inadvertently (e.g., due to an inadvertent software jump) the RMTS does not continue in an active mode. This is assured during execution of the RMTS by checking the flag values. If the predetermined set of signals are matched and/or one of the flags indicate that the environmental enable conditions are satisfied, then operation 210 may be performed, otherwise operation 204 is performed.

At 210, a security handshake is performed between the diagnostic test control module 16 and the processor 32 via the interfaces 20, 30. As an example, a password and/or other credentials may be received from, for example, the diagnostic test control module 16 via the interfaces 20, 30, such via the security interface pin 44. At 212, a HW I/O function is executed to verify the information received during the security handshake. This may include verifying the password and/or other credentials. If the password matches a predetermined password (referred to as an "ECU secret") and/or other security conditions are satisfied, then operation 216 is performed, otherwise operation 214 is performed. As an example, the password may be a 128 or 256 bit password provided on one of the pins of the interface 30. Operations 210 and 212 and/or other operations performed to determine whether security conditions are satisfied may be referred to as a security access control method.

Transitioning from the validation and verification processes is represented by arrows 2 in FIG. 3. If the validation and verification processes are satisfied (i.e., test mode enable conditions including the environmental enable conditions and the one or more security conditions are satisfied), then the low risk RMTS functions 68 may be executed. These functions may be executed based on RMTS signals.

If the validation and verification processes are not satisfied, then a normal boot-up is performed, as represented by operation 214, and limited functions are available. These functions may be executed based on boot diagnostic signals received via the pins 40, 42 and/or the CAN bus. For example, some or all of the low risk RMTS functions 68 may be available for execution based on received RMTS signals from the diagnostic test control module 16. At 214, if not already completed, a power up procedure is completed including performing a running reset and the vehicle control module is booted normally. Operation 237 may be performed subsequent to operation 214. A diagnostic control service function may be performed during operations 237, 238, 240. For example a diagnostic control service function to erase the ETM 52 may only be executable from boot software and interfaces with a software application programming interface (API) provided by a vehicle manufacturer. The API when called invokes the erase of the ETM 52. The RMTS cannot directly erase the ETM 52.

At 216, the processor 32 permits execution of the low risk RMTS functions 68 including ability to exit RMTS and/or request access to software stored in the ETM 52. This may include permitting execution of low risk RMTS functions disclosed herein based on signals received via the RMTS interface. The low risk RMTS functions may include toggling HW I/O pins, reading memory mapped inputs, and requesting access to the high risk RMTS (or ETM 52) functions 62.

At 217, the processor 32 determined whether a request has been received to perform a low risk function. If a request has been received, operation 218 may be performed, otherwise operation 219 may be performed. At 218, the processor 32 executes the low risk functions requested to be performed at 217.

At 219, if a request to access the high risk RMTS functions 62 is received, then operation 220 is performed, otherwise operation 233 may be performed. At 220, the state of the ETM 52 is checked. This may include checking the status of software integrity check (e.g., checksum, HASH and/or other) values in one or more blocks of the ETM 52. The status of the ETM 52 may be reported via the RMTS interface pin 42. This is represented by arrow 3 in FIG. 3. A STATUS signal may be generated indicating the status of the ETM 52, which may be transmitted to the diagnostic test control module 16.

Prior to executing a function stored in the ETM 52, the RMTS validates a programmed software image by calculating and/or validating the software integrity check values for each ETM block. At 221, the processor 32 may determine whether a memory integrity check has been satisfied. For example, the processor 32 may check if any error correction code (ECC) errors have occurred during the calculations of the software integrity check values. If an ECC error has occurred, then access to the high risk RMTS functions may be invalidated, such that operation 224 is performed. If no integrity check failure has occurred, then operation 222 may be performed. The validity check calculations may be terminated at the first ECC error detected for any of the ETM blocks. A running reset may not be performed as a result of an ECC error.

At 222, the processor 32 may determine based on the software integrity check values whether high risk RMTS functions are stored in the ETM 52. If this is not true, then operation 226 may be performed, otherwise operation 232 is performed. In FIGS. 4A-4C, certain operations are illustrated. In an embodiment, one or more of these operations are not performed and/or are skipped. For example, operation 224 (shown as a dashed box) may not be performed, and operation 233 may be performed subsequent to operation 221.

At 224, the processor 32 may prevent access to the ETM 52. As an example, a low risk RMTS function that is used to execute high risk RMTS functions may not be available (or may be disabled). This prevents access to the ETM 52. The low risk RMTS function may be disabled when the software integrity check values indicate no high risk RMTS functions are stored in the ETM 52. At 226, the processor 32 may permit high risk RMTS functions to be downloaded and stored in the ETM 52 and executed.

At 232, the processor 32 may prevent downloading and storing of high risk RMTS functions in the ETM 52. At 232, the processor 32 may permit high risk functions to be executed, modified and/or replaced. Operation 233 may be performed subsequent to operations 224, 226, 232.

At 233, the processor 32 determines whether to exit RMTS. If yes, operation 234 is performed, otherwise operation 217 may be performed. At 234, a power-up reset may be performed in order to boot normally. At 235, the processor 32 may determine whether to boot the vehicle control module normally (i.e. without performing operations in FIG. 4B). This may be based on an instruction received from the diagnostic test control module 16 via the RMTS interface pin 42. If the vehicle control module is to be booted normally, then operation 214 may be performed, otherwise the method may end at 236.

At 237, the processor 32 permits the ETM 52 to be erased based on a diagnostic control signal and may also permit other boot software functions to be executed. The ETM 52 ought to have been erased prior to the ETM 52 being installed in a vehicle and/or the vehicle being provided to a customer. The supplier, a supplier computer and/or network device, and/or the diagnostic test control module 16 may generate the ERASE command to have the ETM 52 erased prior to leaving a facility of the supplier or prior to leaving a facility of a corresponding vehicle manufacturer. If the ETM 52 was not previously erased, a diagnostic control signal may be received to erase the ETM 52 and update the software integrity check values. The processor 32 may remain at 237, unless a diagnostic control signal and/or a reset request is received. Operations 238 and 240 may be performed subsequent to operation 237.

At 238, the processor 32 determines whether a diagnostic control signal has been received from the diagnostic test control module 16 via the boot diagnostic interface pin 40. If a diagnostic control signal has been received to erase the ETM 52, then operation 242 is performed, otherwise operation 237 is performed. Reception of the diagnostic control signal is represented by arrow 5 in FIG. 3. The diagnostic control signal may be provided in an ERASE command signal received from the diagnostic test control module 16 via the boot diagnostic interface pin 40. At 240, the processor 32 determines whether a request to perform a power-up reset has been received. If a reset request has been received, operation 234 may be performed.

At 242, the processor 32 erases the ETM 52 and may update the software integrity check values stored in the blocks of the ETM 52. The ETM 52 is erased using one of the low risk RMTS functions 68. The ETM 52 is not erased using bootloader (or boot code) as the bootloader does not know the addresses of the ETM 52. This prevents unsanctioned risky software from being programed into the ETM 52 and potentially accessed via a side channel attack.

At 246, the processor 32 may execute application functions (or application code) 64 to check status of the ETM 52 based on a DID. This is represented by arrow 6 in FIG. 3. The DID may be periodically generated while executing the application code. One of the application functions 64 may be to generate a DID to check the status of the ETM 52. The DID may be generated using a same function the RMTS would execute to request access to RMTS functions stored in the hybrid memory 34.

At 248, the processor 32 may set status bits and/or generate the signal STATUS indicating whether the ETM 52 has been erased. At 250, the processor 32 transmits the signal STATUS to the diagnostic test control module 16 via the boot diagnostic interface pin 40. The status of the ETM 52 is reported and may include one or more of the following status values: a "not" implemented value indicating there never was any ETM high risk functions stored in the hybrid memory 34; a "present" value indicating the ETM 52 is programmed and valid; an "invalid" value indicating at least some of the high risk RMTS functions are programmed in the ETM 52, but the total code does not pass a checksum verification; an "erased" value indicating that the ETM 52 was erased prior to the current power-up reset; and a "just erased" value indicating that the ETM 52 was erased since the last power-up reset. These values may be indicated as at least a portion of the checksum values.

The diagnostic test control module 16 may generate a diagnostic control signal, such as the diagnostic control signal received prior to operation 242, to have the ETM 52 erased based on the signal STATUS. This may include rebooting the vehicle control module and returning to one of the above-described previous operations, such as operation 202.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The above-described examples allow suppliers to securely implement unique flash drivers for production vehicle control modules. Such drivers may be faster than secure programming loaders and may be quickly erased from memories of the vehicle control modules prior to being installed in a vehicle and/or delivered to a customer. The vehicle control modules may be quickly reflashed prior to shipping, which minimizes scrap costs and eliminates the need for additional manufacturing floor space to reprogram the vehicle control modules.

The disclosed RMTS allows a vehicle control module to be tested and reprogrammed and corresponding ETM to be erased prior to vehicle installation and/or delivery while allowing testing via low risk RMTS functions subsequent to vehicle installation. Erasing of high risk functions prevents unauthorized individuals and/or devices from hacking into and negatively affecting and/or controlling operation of the vehicle control module. The disclosed RMTS eliminates the need for signature based supplier test software, which traditionally requires verification of corresponding signatures prior to permitted installation of the test software. The disclosed RMTS allows suppliers to test (or interrogate) vehicle control modules during production and later in use for warranty analysis. The RMTS does not have performance requirements in the event of signal faults of a vehicle control module. Since the RMTS is not stored in application code space of memory and is not being executed while application code is executed, the RMTS does not affect application code operations. For example, a running reset is not performed if an ECC fault occurs. As an example, the low risk RMTS functions are available to be performed when a vehicle control module is not installed in a vehicle and/or during normal vehicle operation. High risk RMTS functions are not performed when the vehicle control module is installed in a vehicle.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:
1. A vehicle control module comprising:
  a hybrid memory comprising
    application memory configured to store application code,
    boot memory configured to store a first resident manufacturing test software (RMTS) code and boot code, wherein the first RMTS code includes a first set of risk functions, and
    ephemeral test memory configured to temporarily store a second RMTS code, wherein the second RMTS code includes a second set of risk functions accessible only via the first RMTS code; and
  a processor configured to
    based on at least an operating mode of the vehicle control module, execute the application code, the boot code, the first RMTS code and the second RMTS code,
    erase the ephemeral test memory prior to at least one of installation of the vehicle control module in a vehicle or delivery of the vehicle to a customer, and
    based on the first RMTS code,
      permit execution of the first RMTS code prior to and subsequent to installation of the vehicle control module in the vehicle and subsequent to removal from the vehicle, and
      permit execution of the second RMTS code prior to at least one of installation of the vehicle control module in the vehicle or delivery of the vehicle to a customer.

2. The vehicle control module of claim 1, wherein:
the boot memory is configured to store boot code for booting up the vehicle control module; and
a bootloader of the boot code does not have access to the ephemeral test memory.

3. The vehicle control module of claim 1, wherein at least some of the second set of risk functions have a higher risk than the first set of risk functions.

4. The vehicle control module of claim 1, wherein:
the first RMTS code supports production and warranty analysis of the vehicle control module; and
the first RMTS code includes a function for reading inputs of the vehicle control module, a function for arbitrarily driving outputs of the vehicle control module, a function for querying the ephemeral test memory, a function to determine if the second RMTS code is stored in the ephemeral test memory, and a function to initiate a power-up reset of the vehicle control module to exit an RMTS mode of operation.

5. The vehicle control module of claim 1, wherein the second RMTS code includes at least one of a function for manipulating a memory of the vehicle control module or a function for emulating elements of the behavior of the vehicle control module.

6. The vehicle control module of claim 1, wherein:
the processor is configured to (i) receive a diagnostic control signal from a diagnostic test control module to erase the ephemeral test memory, and (ii) based on the diagnostic control signal and while executing boot software, erase the ephemeral test memory; and
the diagnostic test control module is separate from the vehicle control module.

7. The vehicle control module of claim 1, wherein:
the processor is configured to check a status of the ephemeral test memory based on a request signal received from a diagnostic test control module; and
the diagnostic test control module is separate from the vehicle control module.

8. The vehicle control module of claim 7, wherein:
the processor is configured to, if high risk RMTS functions are stored in the ephemeral test memory, at least one of permit access to the ephemeral test memory or execution of the second RMTS code via the first RMTS code; and
the second RMTS code includes the high risk RMTS functions.

9. The vehicle control module of claim 1, wherein the processor is configured to execute the application code and while executing the application code generate a data identifier to check a status of the ephemeral test memory.

10. The vehicle control module of claim 9, wherein:
the processor is configured to
based on the status of the ephemeral test memory, receive a diagnostic control signal from a diagnostic test control module, and
based on a routing identifier, erase the ephemeral test memory and update one or more software integrity check values in one or more blocks of the ephemeral test memory; and
the diagnostic test control module is separate from the vehicle control module.

11. The vehicle control module of claim 1, wherein:
the processor is configured to:
receive and store the second RMTS code in the ephemeral test memory,
generate a software integrity check value indicating a status of at least a portion of the ephemeral test memory, and
store the software integrity check value in a portion of a block of the ephemeral test memory; and
the software integrity check value is a software image of another portion of the block of the ephemeral test memory.

12. The vehicle control module of claim 1, wherein the processor is configured to:
during boot up of the vehicle control module, check a status of an interface of the vehicle control module including receiving signals at the interface;
based on the signals, determining whether a plurality of environmental enabling conditions are satisfied; and
based on whether the plurality of environmental enabling conditions are satisfied, at least one of permitting access to the ephemeral test memory or execution of the second RMTS code.

13. The vehicle control module of claim 12, wherein:
the processor is configured to
execute a security procedure including receiving security information from a diagnostic test control module and verifying the security information, and
if the security information is verified and the environmental enabling conditions are satisfied, then at least one of permitting access to the ephemeral test memory or execution of the second RMTS code; and
the diagnostic test control module is separate from the vehicle control module.

14. The vehicle control module of claim 12, wherein the processor is configured to:
check the status of the interface a predetermined number of times;
determine whether a predetermined period has lapsed since the interface was first checked after a last power up was initiated of the vehicle control module; and
if the environmental enabling conditions are not satisfied after the predetermined number of times or after the predetermined period has lapsed, then boot the vehicle control module, such that at least one of access to or execution of the second RMTS code is prevented.

15. A non-transitory computer-readable medium comprising application memory configured to store application code, boot memory configured to indefinitely store a first resident manufacturing test software (RMTS) code, and ephemeral test memory configured to temporarily store a second RMTS code, wherein the first RMTS code includes a first set of risk functions, wherein the second RMTS code includes a second set of risk functions, the non-transitory computer-readable medium having stored thereon instructions executable by a processor to:
based on at least an operating mode of a vehicle control module, execute the application code, the first RMTS code and the second RMTS code,
erase the ephemeral test memory prior to at least one of installation of the vehicle control module in a vehicle or delivery of the vehicle to a customer, and
based on the first RMTS code,
permit execution of the first RMTS code prior to and subsequent to installation of the vehicle control module in the vehicle, and
permit execution of the second RMTS code prior to at least one of installation of the vehicle control module in the vehicle or delivery of the vehicle to a customer.

16. The non-transitory computer-readable medium of claim 15, wherein:
- at least some of the second RMTS code includes higher risk functions than the first RMTS code;
- the first RMTS code includes a function for reading inputs of the vehicle control module, a function for arbitrarily driving outputs of the vehicle control module, a function for querying the ephemeral test memory, a function to determine if the second RMTS code is stored in the ephemeral test memory and access the second RMTS code if stored in the ephemeral test memory, and a function to initiate a power-up reset of the vehicle control module; and
- the second RMTS code includes at least one of a function for manipulating a memory of the vehicle control module or a function for emulating elements of the behavior of the vehicle control module.

17. The non-transitory computer-readable medium of claim 15, wherein:
- the instructions are further to:
  - check a status of the ephemeral test memory based on a request signal received from a diagnostic test control module, wherein the diagnostic test control module is separate from the vehicle control module, and
  - if high risk RMTS functions are stored in the ephemeral test memory, at least one of permit access to the ephemeral test memory or execution of the second RMTS code; and
- the second RMTS code includes the high risk RMTS functions.

18. The non-transitory computer-readable medium of claim 15, wherein the instructions are further to:
- execute the application code and while executing the application code generate a data identifier to check a status of the ephemeral test memory;
- based on the status of the ephemeral test memory, receive a diagnostic control signal from a diagnostic test control module, wherein the diagnostic test control module is separate from the vehicle control module; and
- based on the diagnostic control signal, erase the ephemeral test memory and update one or more software integrity check values in one or more blocks of the ephemeral test memory.

19. The non-transitory computer-readable medium of claim 15, wherein:
- the instructions are further to
  - receive and store the second RMTS code in the ephemeral test memory,
  - generate a software integrity check value indicating a status of at least a portion of the ephemeral test memory, and
  - store the software integrity check value in a portion of a block of the ephemeral test memory; and
- the software integrity check value is a software image of a second portion of the block of the ephemeral test memory.

20. The non-transitory computer-readable medium of claim 15, wherein the instructions are further to:
- during boot up of the vehicle control module, check a status of an interface of the vehicle control module including receiving signals at the interface;
- based on the signals, determine whether a plurality of environmental enabling conditions are satisfied; and
- based on whether the plurality of environmental enabling conditions are satisfied, execute the first RMTS code and at least one of permit access to the ephemeral test memory or execution of the second RMTS code via the first RMTS code.

* * * * *